United States Patent [19]

Nelson

[11] Patent Number: 4,842,449
[45] Date of Patent: Jun. 27, 1989

[54] PNEUMATIC EVACUATOR-FILLER FOR GRAIN DRILL HOPPER

[75] Inventor: Marvin L. Nelson, Downers Grove, Ill.

[73] Assignee: J. I. Case Company, Racine, Wis.

[21] Appl. No.: 72,412

[22] Filed: Jul. 13, 1987

[51] Int. Cl.⁴ .............................................. B65G 53/14
[52] U.S. Cl. ...................................... 406/153; 406/41; 141/65
[58] Field of Search ......................... 406/38, 39, 41, 42, 406/139, 145, 43, 40, 151–153, 144, 44, 130, 93, 113; 193/9; 141/65; 111/34; 222/630

[56] References Cited

U.S. PATENT DOCUMENTS

| | | | |
|---|---|---|---|
| 1,278,175 | 9/1918 | Le Baron | 406/153 X |
| 1,500,966 | 7/1924 | Supinger | 406/42 |
| 2,059,950 | 11/1936 | Johnson | 406/42 X |
| 2,653,438 | 9/1953 | Ramirez, Sr. | 406/153 X |
| 3,063,755 | 11/1962 | Wijdereld et al. | 406/153 X |
| 3,186,769 | 6/1965 | Howlett, Jr. | 406/153 |
| 3,306,672 | 2/1967 | Kleiner et al. | 406/153 |
| 3,378,309 | 4/1968 | Copley et al. | 406/153 |
| 3,512,841 | 5/1970 | Kollasch et al. | 406/153 X |
| 4,105,256 | 8/1978 | Parker et al. | 406/153 |
| 4,363,573 | 12/1982 | Ginther et al. | 406/153 X |

*Primary Examiner*—Joseph F. Peters, Jr.
*Assistant Examiner*—James M. Kannofsky
*Attorney, Agent, or Firm*—Dressler, Goldsmith, Shore, Sutker & Milnamow, Ltd.

[57] ABSTRACT

An aspirator attachment connectable to a conventional grain/air drill hopper for emptying or filling the hopper with grain or fertilizer. The attachment comprises a simple air flow director which may be readily connected to a discharge port of the centrifugal blower carried by the hopper. Standard tubing or hoses are connected to the air flow director for picking up the grain or fertilizer and for directing discharge thereof to a desired location. No modification of existing grain hopper structure is required.

3 Claims, 2 Drawing Sheets

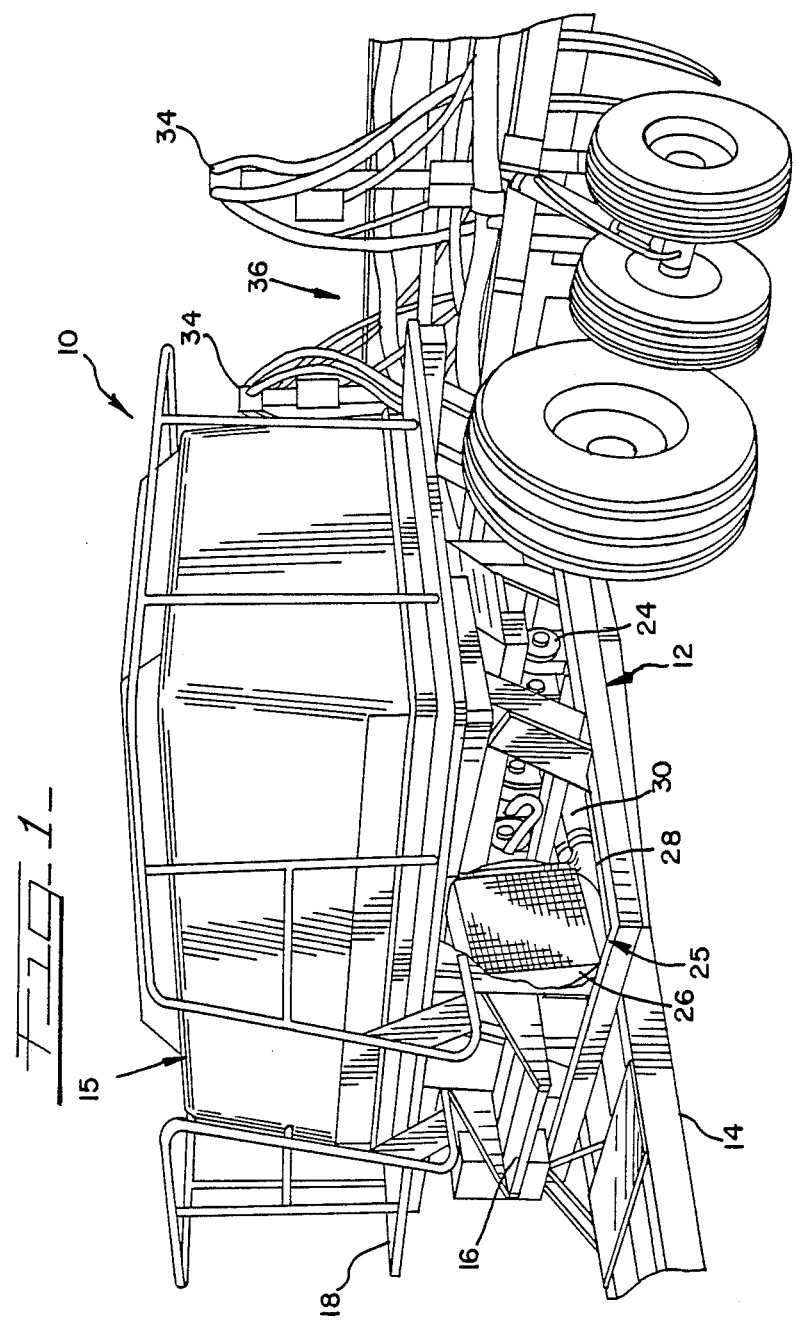

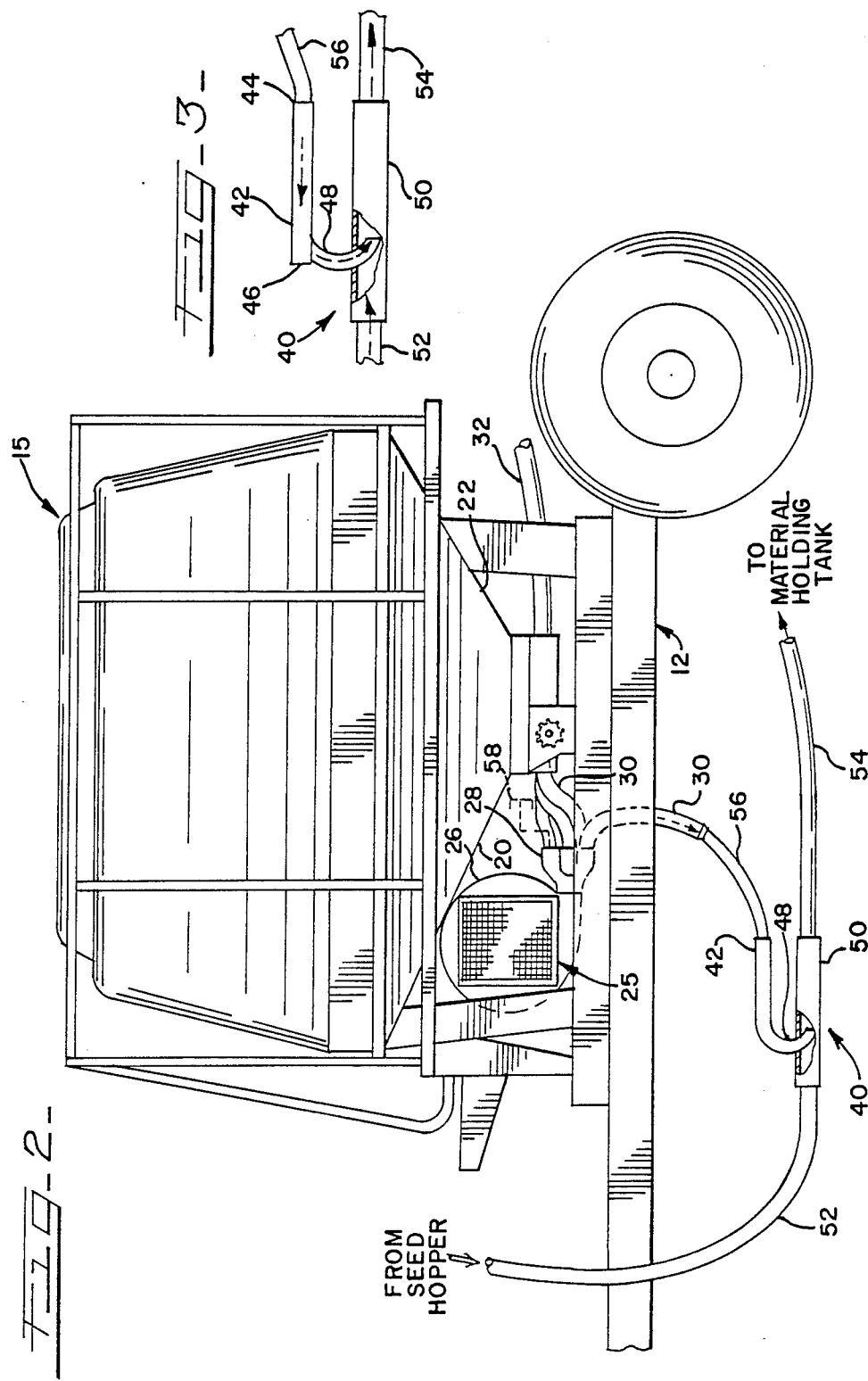

PNEUMATIC EVACUATOR-FILLER FOR GRAIN DRILL HOPPER

TECHNICAL FIELD

This invention relates to agricultural seeding implements known as grain drills and, more particularly, to a combination evacuator and filler for the seed hopper of a grain drill.

BACKGROUND OF THE INVENTION

Grain drills are employed for field planting of a wide variety of seed crops, such as barley, lentils, oats, rice, rye, and the like. In general, a grain drill comprises a wheel mounted seed hopper of substantial capacity adapted to be connected to and drawn by a tractor or the like. A wheel mounted air drill is connected to the rear of the hopper and comprises a frame with a number of foldable sections carrying a multiplicity of colters and hose manifolds for delivering the seeds to each colter. The bottom of the seed hopper is provided with a number of metering gates related to the number of hose manifolds, and feeder tubes connect the metering gates to the hose manifolds. A blower is carried by the hopper forwardly of the metering gates and the blower output includes a splitter to which is connectable an air hose for each of the metering gates. The blower provides a pneumatic pressure for feeding the seeds and/or fertilizer which may also be carried in the hopper to the air drill.

Typically, the farmer will begin the planting process by filling the hopper with a particular seed and/or fertilizer. Depending on the size of the field being planted with the particular seed, the farmer will either need to refill the emptied hopper or empty from the hopper the store of seeds still remaining therein. In any case, it is unlikely that the hopper supply of seeds and/or fertilizer will ever match precisely the planting requirements.

Seed hoppers of the type under consideration are relatively large, vehicle-like containers. For example, a production model manufactured by the assignee of the present invention has a capacity on the order of 150 bushels or 5 ¼ cubic meters of grain and/or fertilizer. Frequently, the hopper will be filled manually from a storage area by means of a shovel or other similar instrument. In order to remove and conserve valuable grain, the farmer will most often physically enter the hopper and use a shovel or the like to transfer the remainder to a storage or holding container. Alternatively, large or corporate farms might employ some expensive auxiliary equipment, such as conveyors or vacuum devices, for filling or emptying the hopper. Such equipment is, of course, generally not available to the average farmer.

There thus exists a need for a simple and convenient device for emptying and filling a grain drill hopper. The device should be efficiently operable by the tractor operator and add little to the cost of the grain drill equipment. Ideally, the device should operate basically with already existing grain drill structure and require little, if any, modification thereof.

SUMMARY OF THE INVENTION

The present invention provides a means for emptying or filling the hopper of a grain drill which eliminates the manual labor aspects of such operations. The invention operates essentially with conventional elements present on existing grain drills so that additional expensive equipment is not required.

In general, the invention comprises aspirator means in the form of a pneumatic air flow director. The air flow director is attachable with conventional tubing to one of the air outlets of the hopper's blower splitter. When so connected, the blower creates a positive air pressure at one end of the flow director and a negative pressure at the opposite end of the flow director. Conventional tube are connected to both ends of the air flow director whereby the director functions as an aspirator through the tube connected to the negative pressure end. Placement of the free end of the aspirator tube into contact with grain or fertilizer in the hopper causes said material to be sucked out of the hopper and through the director and tube connected to the positive pressure side. The free end of the positive pressure tube may be positioned over a collection tank for receipt of the aspirated material. Similarly, the invention is adaptable for filling the hopper by placement of the aspirator tube in a material storage tank and directing the material flow from the positive tube into the hopper.

The aspirator device and tubing comprise relatively inexpensive and easy to handle attachments which are readily connectable to the existing blower structure. Emptying or filling operations thus may be conveniently and efficiently carried out by a single operator with substantial elimination of manual effort.

Numerous other advantages and features of the present invention will become apparent from the following detailed description of the invention, from the claims and from the accompanying drawings.

BRIEF DESCRIPTION OF THE DRAWINGS

In the accompanying drawings forming a part of the specification, and in which like numerals are employed to designate like parts throughout, FIG. 1 is a fragmentary perspective view of a conventional grain drill;

FIG. 2 is a fragmentary side elevational view illustrating operational connection of the invention to the grain drill; and FIG. 3 is an enlarged, fragmentary detail view of the air flow director.

DETAILED DESCRIPTION OF THE INVENTION

Referring with greater particularity to the FIGS. of the drawings, it will be seen that the reference numeral 10 indicates generally a conventional grain drill of the type with which the invention is associated. Grain drill 10 comprises a carriage 12 having a yoke 14 at the front thereof for operational connection to a towing vehicle such as a tractor. A hopper 15 is supported on the carriage 12, and said hopper includes a step 16 at the front thereof and a gangway 18 therearound for gaining access to the interior of the hopper through a top lid (not shown).

The hopper 15 comprises sloping bottom walls 20 and 22 which taper downwardly to direct the contained grain or fertilizer material for gravity discharge through a plurality of metering gates 24. A centrifugal blower fan 25 is mounted on the carriage 12 forwardly of the metering gates 24. The blower 25 comprises a scroll-type housing 26 which terminates in a multi-port outlet or splitter 28. The splitter 28 comprises as many ports as there are metering gates 24, and an air hose 30 is releasably connected between each splitter port and its associated metering gate. Feeder tubes 32 are associated with the metering gates 24 (see FIG. 2) and likewise communicate with the air hoses 30 through venturi means (not shown). The feeder tubes 2 are in turn connected to hose manifolds 34 carried by an air drill 36 connected to the rear of the carriage 12.

The structure thus far described is conventional and well-known. Operation is likewise conventional, the blower 25 supplying the pneumatic force for delivering the grain or fertilizer from the hopper to the air drill, and the power for the blower typically being provided by a power take-off from the towing vehicle.

Aspirator means comprising an air flow director 40 is associated with the grain drill 10 for emptying or filling the hopper 15. Air flow director 40 comprises an elongated upper air chamber 42 having an open end 44 and a closed end 46. A curved pipe or elbow 48 depends from the air chamber 42 and said elbow is secured to and communicates with an open-ended elongated lower air chamber 50. As indicated by the arrows in FIG. 3, air entering upper chamber 42 under pressure will flow in the reverse direction through lower chamber 50, thereby creating a positive pressure downstream of the elbow 48 (to the right in FIG. 3) and a negative pressure upstream of the elbow. A siphon or pick-up tube 52 is connected to the upstream or negative pressure end of the lower chamber 50 and an output tube 54 is connected to the downstream or positive pressure end of said chamber. A connector tube or hose 56 is connected to the open end 44 of the upper chamber 42 and said hose is releasably connectable to any of the air hoses 30 whereby air under pressure from the blower 25 may be applied to the air flow director 40.

Operation of the invention should now be readily understandable without further description. When emptying or filling operations are required, it is simply necessary to disconnect one of the air hoses 30 from its associated metering gate and connect the hose 56 to said hose. With the blower 25 operating, the pick-up tube 52 may now be placed into contact with material in the hopper, while the output tube 54 is positioned to direct aspirated material into a holding tank or the like. For filling the hopper, it is only necessary to place the pick-up tube 52 into a storage source of material while the output tube 54 is positioned to direct aspirated material into the hopper. If increased air pressure or aspirator effect is required or desired, additional or all of the air hoses 30 may be disconnected and said hoses or the ports in the blower splitter 28 temporarily capped such as with one or more suitable caps 58, as shown in FIG. 2.

It will be appreciated from the foregoing detailed description of the invention and illustrative embodiment thereof that numerous variations and modifications may be effected without departing from the true spirit and scope of the novel concept of the principles of the invention.

What is claimed is:

1. A pneumatically-operated evacuator-filler for a grain drill having a storage hopper, a plurality of metering gates, and blower means for delivering planting material from said storage hopper to said plurality of metering gates, said evacuator-filler comprising:

air splitter means operatively connected to an outlet of said blower means, said splitter means defining a plurality of outlet ports corresponding in number to said plurality of metering gates;

closing means for closing all but one of said outlet ports of said splitter means so that substantially all of the air flow from said blower means is directed through said one of said outlet ports of said splitter means;

an air flow director comprising an elongated open-ended chamber, and including air directions means for directing air flow longitudinally through said chamber to create a positive downstream pressure at one end of said chamber and a negative upstream pressure at the other end of said chamber;

conduit means connectable between said air direction means of said air flow director and said one outlet port of said splitter means for supplying air flow from said blower means to said air direction means;

a pick-up hose connected to the said chamber at the negative pressure end of said chamber, and adapted to aspirate planting material into said air flow director; and an output hose connected to the said chamber at the positive pressure side of said chamber, and adapted to discharge and direct the planting material from said director.

2. An aspirator attachment according to claim 1 wherein said air direction means comprises a curved pipe communicating with the interior of said chamber.

3. An aspirator attachment according to claim 2 comprising:

a second elongated chamber having a closed end and an open end, said curved pipe being connected between said first and second chambers and said conduit means being connected to the open end of said second chamber.

* * * * *